United States Patent [19]
Lee

[11] Patent Number: 5,631,761
[45] Date of Patent: May 20, 1997

[54] DRIVE MOTOR FOR ROTATING MULTI-FACETED MIRROR

[75] Inventor: Chang-woo Lee, Suwon, Rep. of Korea

[73] Assignee: Samsung Electronics Co., Ltd., Kyungki-do, Rep. of Korea

[21] Appl. No.: 581,407

[22] Filed: Dec. 29, 1995

[51] Int. Cl.⁶ ................................. G02B 26/08
[52] U.S. Cl. .................... 359/200; 359/198; 359/216; 384/100
[58] Field of Search ...................... 359/198–200, 359/216–219; 384/100, 108, 109, 112, 123; 310/90

[56] References Cited

U.S. PATENT DOCUMENTS 5,430,571  7/1995  Witteveen .......................... 359/200

*Primary Examiner*—James Phan
*Attorney, Agent, or Firm*—Sughrue, Mion, Zinn, Macpeak & Seas

[57] ABSTRACT

A drive motor for rotating a multi-faceted mirror to change the path of a laser beam in a laser printer or a laser scanner. The drive motor for rotating the multi-faceted mirror has a stator, a rotor, and a bearing disposed between the stator and the rotor for supporting the rotation of the rotor, and the bearing is a hemispherical fluid bearing. Therefore, shaking and noise can be efficiently reduced when a laser printer or a laser scanner prints or scans at a high speed.

9 Claims, 3 Drawing Sheets

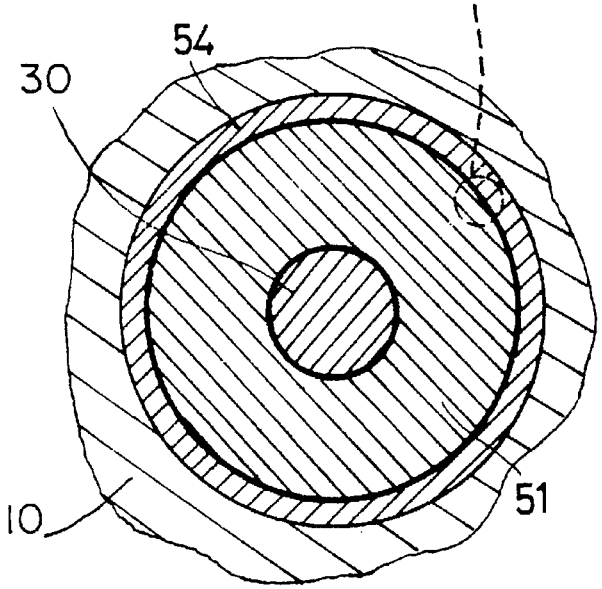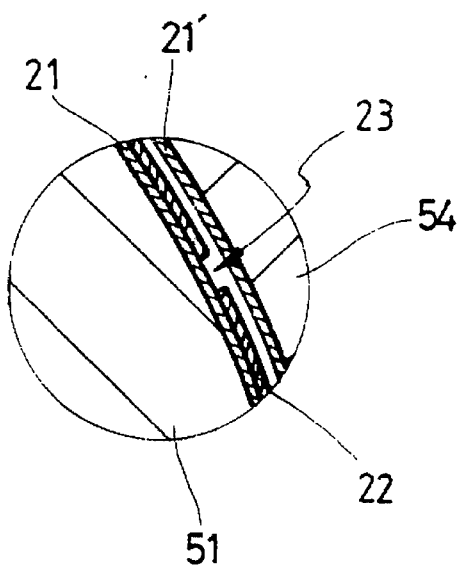

DRIVE MOTOR FOR ROTATING MULTI-FACETED MIRROR

BACKGROUND OF THE INVENTION

The present invention relates to a drive motor for rotating a multi-faceted mirror, and more particularly, to a drive motor for rotating a multi-faceted mirror, which is used to change the path of a laser beam in a laser printer or a laser scanner.

An optical data processing device such as a laser printer or a laser scanner has been developed to process optical data on a large scale. The optical data processing device for printing or scanning a large amount of data at high speed is comprised of a laser 1 with excellent convergence, a high-speed beam deflector 2, rotating a multi-faceted mirror 3, and a drive motor 4 for rotating the multi-faceted mirror 3, as shown in FIG. 1.

FIG. 2 is a simplified view of a bearing portion of a conventional drive motor for rotating a multi-faceted mirror. As shown in FIG. 2, a pair of upper and lower ball bearings 40 are disposed between a bearing housing 10 and a shaft 30 fixed to a rotor 41 of the motor. The reference numeral 11 denotes a bearing cover.

There are no problems during printing or scanning with drive motors having ball bearings 40 installed therein, as long as the printer or scanner operates at a low speed. However, significant problems occur when the printer or scanner operates at a high speed. That is, if printing or scanning is performed by rotating the multi-faceted mirror 3 at above speeds of 20,000 RPM, there is significant shaking and noise in the ball bearings 40, which are contact-type bearings.

SUMMARY OF THE INVENTION

The object of the present invention is to provide a drive motor for rotating a multi-faceted mirror, in which an improved bearing is used to efficiently reduce shaking and noise when an optical data processing device such as a laser printer or a laser scanner prints or scans.

To achieve the above object, there is provided a drive motor for rotating a multi-faceted mirror, comprising a stator, a rotor, and a bearing disposed between the stator and the rotor, for supporting the rotation of the rotor, wherein the bearing is a hemispherical fluid bearing.

In addition, the hemispherical fluid bearing comprises upper and lower inner rings which are hemispherical and fitted on a shaft fixed through their centers to the rotor to face each other, and an outer ring held in the stator, for supporting the rotation of the upper and lower inner rings.

At least one of the inner rings and the outer ring has a first film coating of either titanium or ceramic formed on the lubricating surface thereof. The outer ring is formed of ceramic. In addition to the above first film coating, there is a second film coating of a diamond-like-carbon formed thereon.

BRIEF DESCRIPTION OF THE DRAWINGS

The above object and advantages of the present invention will become more apparent by describing in detail a preferred embodiment thereof with reference to the accompanying drawings, in which:

FIG. 4A is a sectional view taken along the section 4A—4A of FIG. 3, and FIG. 4B is an enlarged portion of FIG. 4A.

DETAILED DESCRIPTION OF THE PREFERRED EMBODIMENT

Figure 1:
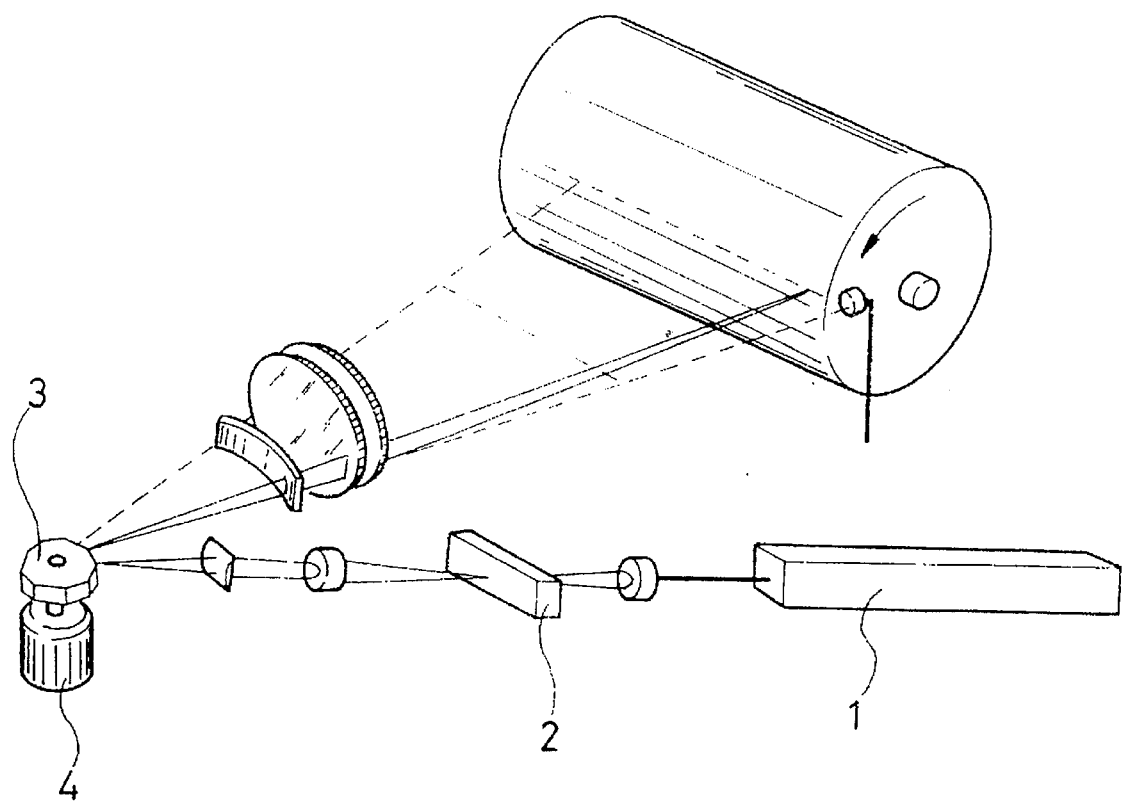
FIG. 1 is a simplified schematic view of a typical laser printer.
Figure 2:
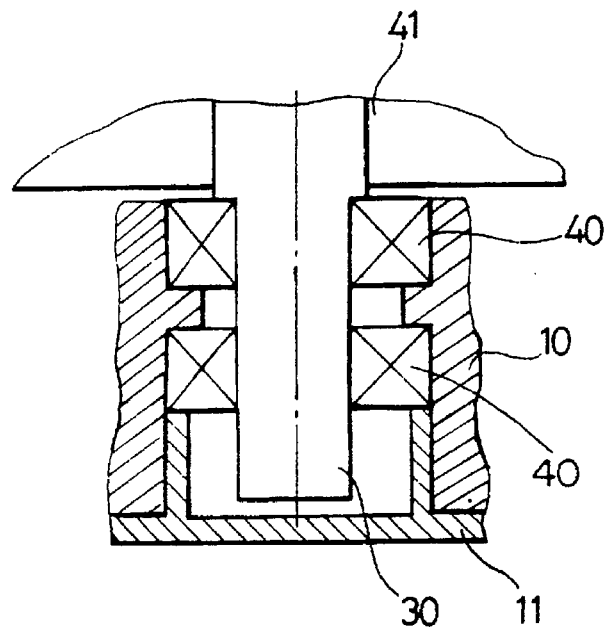
FIG. 2 is a sectional view of a bearing portion in a conventional drive motor for rotating a multi-faceted mirror.
Figure 3:
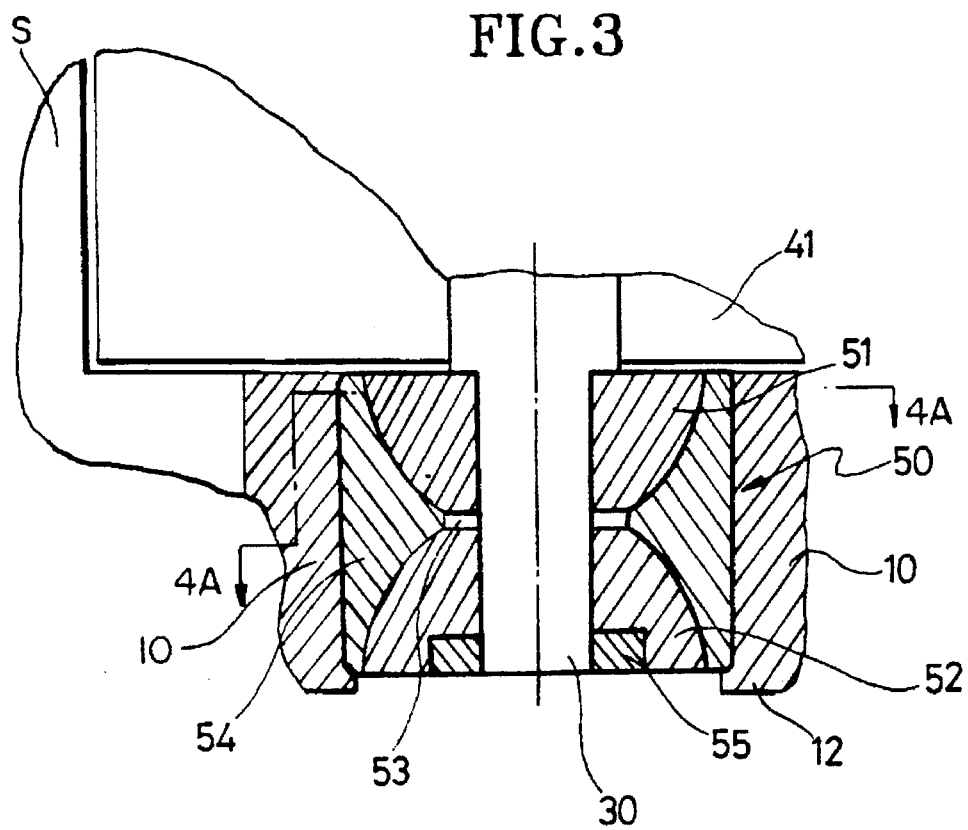
FIG. 3 is a sectional view of a bearing portion in a drive motor for rotating a multi-faceted mirror according to the present invention.

As shown in FIG. 3, the structure of a drive motor for rotating a multi-faceted mirror according to the present invention is similar to that of the conventional drive motor for rotating a multi-faceted mirror in FIG. 2. The drive motor for rotating the multi-faceted mirror is comprised of a rotor 41 for rotating a multi-faceted mirror 3, a stator S disposed around rotor 41 for electrically interacting with rotor 41 so that rotor 41 rotates, a motor shaft 30 inserted into rotor 41, a bearing 50 through which a motor shaft 30 is fitted for supporting motor shaft 30 as it rotates, and a bearing housing 10 for holding the bearing 50. Unlike the conventional ball bearing, the bearing 50 is a hemispherical fluid bearing.

Hemispherical fluid bearing 50 has an upper inner ring 51 and a lower inner ring 52, each hemispherical in shape, fixed to the shaft 30 with the spherical sides of the rings facing each other, an outer ring 54 fixed in the bearing housing 10 for supporting the inner rings 51 and 52 as they rotate, a spacer 53 disposed between the upper inner ring 51 and the lower inner ring 52, for maintaining clearance between the outer ring 54 and the inner rings 51 and 52, and a ring 55 for holding upper inner ring 51 and lower inner ring 52 on the motor shaft 30. The ring 55 may be forcibly fitted or be screw-combined with motor shaft 30. In FIG. 3, reference numeral 12 denotes a housing shoulder for keeping the bearing 50 from sliding down along shaft 30.

Referring to FIGS. 4A and 4B, the upper inner ring 51 and the lower inner ring 52 formed mainly of high carbon steel or tungsten cobalt (WCo) are coated with a 5–20 μm thick titanium (Ti) film 21. Similarly, the lubricating surface of outer ring 54 is formed mainly of high carbon steel or WCo and is coated with a 5–20 μm thick Ti film 21'. Ti film coatings 21 and 21' can be replaced with a ceramic coating, for example, an $Al_2O_3$ film coating. In addition, upper inner ring 51, lower inner ring 52, and outer ring 54 may all be formed of ceramic.

The film coating serves to alleviate abrasion between the outer ring 54 and the upper inner ring 51, and between the outer ring 54 and the lower inner ring 52, which is caused by solid friction therebetween when a motor starts or stops, namely, at or below a threshold speed.

On the other hand, to further reduce the abrasion caused by the solid friction, a diamond-like-carbon (DLC) film 22 of 5– 10 μm is coated on Ti film coating 21 of upper ring 51 and lower inner ring 52. Since the DLC coating 22 has a linear expansion coefficient similar to that of Ti film coating 21, the risk of flaking or a change in clearance is minimal. Further, the former is more resistant to friction than the latter, thus the DLC coating 22 can more efficiently alleviate the impact of the solid friction.

A groove 23 is formed in the DLC film coating 22. Groove 23 may reach Ti film coating 21 through DLC film coating 22 depending on the thickness of DLC film coating 22. Groove 23 lifts the upper inner ring 51 and the lower inner ring 52 away from the outer ring 54 by generating oil pressure or air pressure when they rotate. Further, DLC film coating 22 and groove 23 may be provided no outer ring 54.

An embodiment of a method for manufacturing the above hemispherical fluid bearing will be described, in detail. Upper inner ring 51 and lower inner ring 52 formed mainly of high carbon or WCo are lapping-machined to have an out-of-sphericity of 0.15–0.25 μm, and their spherical surfaces are coated with a 5–20 μm thick Ti film. Then, a 5–10 μm thick DLC film is coated on the Ti film.

A Ti ion beam projection method or a Ti gas deposition method can be used for coating the Ti film. The Ti film can be replaced with a ceramic film which is deposited by the same method.

The lubricating surface of outer ring 54 is coated with a Ti film or a ceramic film to a thickness of 5–20 μm. Thereafter, the groove 23 is formed in the DLC film coating 22 by a chemical corrosion method or an electrical discharge machining method.

The above hemispherical fluid bearing is assembled into a drive motor in the following sequence. First, upper inner ring 51 is fixed to motor shaft 30 by, for example, shrinkage fitting, to prevent upper inner ring 51 from slipping from motor shaft 30. Then, spacer 53 is fitted on the shaft 30, and outer ring 54 is inserted in bearing housing 10 by, for example, the shrinkage fitting. Lower inner ring 52 is fitted on the shaft 30 in the same manner. Thereafter, ring 55 is forcibly fitted or screw-combined with motor shaft 30.

As described above, the drive motor for rotating a multi-faceted mirror according to the present invention can efficiently reduce oscillations and noise when a laser printer or a laser scanner prints or scans at a high speed.

What is claimed is:

1. A drive motor for rotating a multi-faceted mirror, comprising a stator, a rotor, and a bearing disposed between said stator and said rotor for supporting the rotation of said rotor, wherein said bearing is a hemispherical fluid bearing, said hemispherical fluid bearing comprising an upper inner ring and a lower inner ring which are hemispherical so as to define a lubricating surface and fitted on a shaft fixed to said rotor to face each other, and an outer ring held in said stator and defining a lubricating surface for supporting the rotation of said upper inner ring and said lower inner ring.

2. The drive motor for rotating a multi-faceted mirror as claimed in claim 1, wherein at least one of said inner rings and said outer ring has a first film coating of one of titanium and ceramic formed on the lubricating surface thereof.

3. The drive motor for rotating a multi-faceted mirror as claimed in claim 2, wherein said outer ring is formed of ceramic.

4. The drive motor for rotating a multi-faceted mirror as claimed in claim 2, wherein a second film coating of a diamond-like-carbon is formed on said first film coating.

5. The drive motor for rotating a multi-faceted mirror as claimed in claim 4, wherein a predetermined groove is formed in said second film coating.

6. The drive motor for rotating a multi-faceted mirror as claimed in claim 5, wherein said groove extends to said first film coating.

7. The drive motor for rotating a multi-faceted mirror as claimed in claim 5, wherein said second film coating is 5–10 μm thick.

8. The drive motor for rotating a multi-faceted mirror as claimed in claim 4, wherein said first film coating is 5–20 μm thick.

9. The drive motor for rotating a multi-faceted mirror as claimed in claim 4, wherein said second film coating is 5–10 μm thick.

* * * * *